(12) United States Patent
Kervec et al.

(10) Patent No.: US 8,669,968 B2
(45) Date of Patent: Mar. 11, 2014

(54) VIDEO IMAGE DISPLAY METHOD AND DISPLAY PANEL USING IT

(75) Inventors: Jonathan Kervec, Paimpont (FR); Patrick Morvan, Laille (FR); Julien Thollot, Treves (FR)

(73) Assignee: Thomson Licensing, Issy-les-Moulineaux (FR)

( * ) Notice: Subject to any disclaimer, the term of this patent is extended or adjusted under 35 U.S.C. 154(b) by 1725 days.

(21) Appl. No.: 11/402,015

(22) Filed: Apr. 11, 2006

(65) Prior Publication Data

US 2006/0232717 A1 Oct. 19, 2006

(30) Foreign Application Priority Data

Apr. 15, 2005 (FR) ...................................... 05 50959

(51) Int. Cl.
*G09G 5/00* (2006.01)
(52) U.S. Cl.
USPC ................................ 345/204; 345/60; 345/63
(58) Field of Classification Search
USPC ............................................. 345/204, 60, 63
See application file for complete search history.

(56) References Cited

U.S. PATENT DOCUMENTS

| | | | |
|---|---|---|---|
| 6,052,112 A * | 4/2000 | Tanaka et al. ................. | 345/596 |
| 6,326,980 B1 * | 12/2001 | Worley, III .................... | 345/691 |
| 6,392,656 B1 | 5/2002 | Someya et al. | |
| 6,590,549 B1 | 7/2003 | Marshall | |
| 6,894,664 B2 * | 5/2005 | Thebault et al. ................ | 345/60 |
| 6,970,148 B2 * | 11/2005 | Itoh et al. ......................... | 345/63 |
| 7,006,066 B2 * | 2/2006 | Chen et al. ...................... | 345/90 |
| 2003/0011614 A1 | 1/2003 | Itoh et al. | |
| 2004/0041768 A1 | 3/2004 | Chen et al. | |
| 2004/0155847 A1 | 8/2004 | Taoka et al. | |
| 2004/0263502 A1 | 12/2004 | Dallas et al. | |
| 2008/0100633 A1 * | 5/2008 | Dallas et al. .................. | 345/530 |

FOREIGN PATENT DOCUMENTS

| | | |
|---|---|---|
| EP | 0 698 874 A1 | 2/1996 |
| JP | 2004240317 | 8/2004 |
| JP | 2001202057 | 7/2011 |
| WO | WO2005018237 | 2/2005 |

OTHER PUBLICATIONS

European Search Report.

* cited by examiner

*Primary Examiner* — William Boddie
*Assistant Examiner* — Leonid Shapiro
(74) *Attorney, Agent, or Firm* — Myers Wolin LLC

(57) ABSTRACT

The present invention relates to a method of displaying a color video image in a sequential color display panel. The video frame is divided into a plurality of consecutive time segments each assigned to a given color component, and the video level of the pixels of the image is displayed by modulating the display time of the corresponding cells. The invention aims to propose a display method that reduces the blurring effect without causing color break-up. According to the invention, at least one reference time segment is defined in said plurality of time segments, and the image is displayed giving priority to lighting the cells during the reference time segment and the time segments closest to the reference time segment.

6 Claims, 4 Drawing Sheets

1 frame

Emission of light for an average video level (128)

VIDEO IMAGE DISPLAY METHOD AND DISPLAY PANEL USING IT

This application claims the benefit, under 35 U.S.C. §119 of French Patent Application 05/50959 filed Apr. 15, 2005.

FIELD OF THE INVENTION

The present invention relates to a method of displaying a colour video image in a sequential colour display panel including a plurality of display cells, wherein the video image to be displayed comprises a plurality of colour components and the image display period is divided into a plurality of consecutive time segments with at least three time segments assigned to each of the colour components, and wherein the video level of the pixels of the image is displayed by modulating the display time of the corresponding cells. It also relates to a display panel using the method. The invention applies more particularly to sequential colour display panels such as liquid crystal on silicon (LCOS) screens, organic light-emitting diode (OLED) screens, and micromirror (DMD) screens.

BACKGROUND OF THE INVENTION

Sequential colour display is conventionally used in projectors to display a colour image with a single display cell valve. FIG. 1 shows the division of one display period of a video image, called a video frame, into a plurality of time segments each assigned to one colour component of the image. In this example of subdivision, the video frame includes three time segments for each colour component, i.e. three segments R1, R2, R3 for the red component, three segments G1, G2, G3 for the green component, and three segments B1, B2, B3 for the blue component. Each red time segment is followed by a green time segment and then a blue time segment. These segments generally have substantially identical durations.

With this kind of video frame structure, the colour components of the video signal of the image are displayed sequentially one after the other, the colours of the pixels of the image being restored thereafter by an effect of integration (in the human eye). The use of a plurality of time segments for each colour component enables the emission of light to be distributed over the whole duration of the frame and to group closely together the emissions of red, green and blue light. This reduces the phenomenon of colour break-up perceived by the human eye when the emissions of different colours are far apart, for example when there is an average red emission at the beginning of the frame, an average green emission in the middle of the frame and an average blue emission at the end of the frame.

In the case of micromirror (DMD) projectors using binary planes to address the micromirror cells, the video frame portion associated with each colour component is divided into sub-periods, usually called sub-scans, having different durations and distributed in the various time segments associated with said colour. One solution for limiting colour break-up even further in this type of projector is to divide the sub-scans of longer duration into sub-scans of shorter duration and to distribute them over all the time segments of the frame to spread the emission of light even further. This results in emission of light that is distributed almost uniformly between the time segments for a given colour.

In the case of LCOS or OLED valve projectors, the cells of the valve are generally addressed segment by segment using voltage control or current control to emit or to pass the same quantity of light during each segment of a given colour. FIG. 2 shows the distribution of light emitted for a video level 128 to be displayed using an LCOS or OLED valve and a uniform distribution between the segments. The same quantity of light is emitted during each of the time segments. This results in a light emission distribution almost identical to that of DMD valve projectors when the more significant sub-scans are distributed over all the time segments of the frame.

The drawback of this spreading of light is that it generates a blurring effect in the images displayed.

SUMMARY OF THE INVENTION

The present invention proposes a solution for reducing this blurring effect without creating any phenomenon of light break-up.

The present invention relates to a method of displaying a colour video image in a sequential colour display panel including a plurality of display cells, wherein the video image to be displayed comprises a plurality of colour components and the image display period is divided into a plurality of consecutive time segments with at least three time segments assigned to each of the colour components, and wherein the video level of the pixels of the image is displayed by modulating the display time of the corresponding cells. The method comprises the following steps:

defining at least one reference time segment in said plurality of time segments, and displaying the image giving priority to lighting the cells during the reference time segment and the time segments closest to the reference time segment.

Accordingly, the light emitted by the cells is concentrated around the reference time segment and is not spread over the entire video frame, which reduces the blurring effect without increasing the phenomenon of colour break-up, because the different colour light emissions remain very close together.

In one particular embodiment, the reference time segment is in the vicinity of the middle of the video image display period.

To concentrate further the emission of light in the vicinity of the reference time segment, if a cell is not lit throughout a time segment, it is advantageously lit during the portion of the time segment closest to the reference time segment.

Finally, the reference time segment is preferably a time segment assigned to the green component of the video signal.

The invention also relates to a sequential colour display panel for displaying a video image and including a plurality of display cells, the video image to be displayed being supplied to the panel in the form of a signal comprising a plurality of colour components, wherein the image display period is divided into a plurality of consecutive time segments with at least three time segments assigned to each of the colour components and the video level of the pixels of the image is displayed by modulating the display time of the corresponding cells. According to the invention it comprises means for displaying the image by giving priority to lighting the cells during a reference time segment selected from said plurality of time segments and during the time segments closest to the reference time segment.

BRIEF DESCRIPTION OF THE DRAWINGS

The invention will be better understood on reading the following description, which is given by way of nonlimiting example and with reference to the appended drawings, in which.

DETAILED DESCRIPTION OF PREFERRED EMBODIMENTS

The invention proposes a method in which the emission of light is concentrated on and in the vicinity of one or more reference time segments. This reduces the spreading of the emission of light in the frame and the phenomenon of break-up of the light perceived by the human eye is also very low because the emissions of light of the three colour components are very close together.

Figure 1:
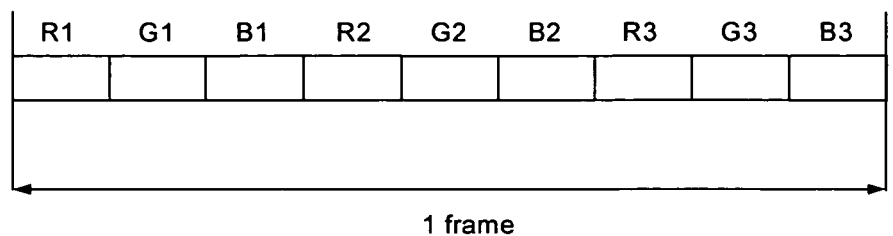
FIG. 1 shows a video frame divided into time segments each associated with a colour component of the video signal.
Figure 2:
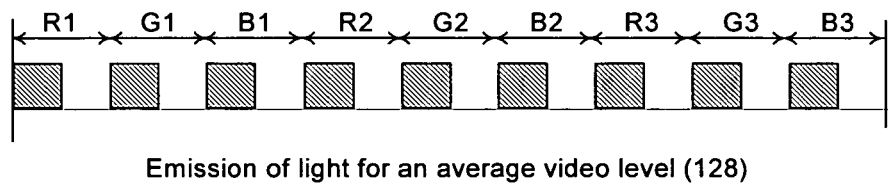
FIG. 2 shows the emission of light for a level of 128 during a video frame in a conventional LCOS valve projector.

The invention is illustrated in the case of a video frame identical to that shown in FIG. 1 including three time segments for each colour. Of course, the invention is equally applicable to a video frame including a greater number of time segments, for example as illustrated later in the description with reference to FIG. 6.

In the general case a single reference time segment is defined. This is advantageously a time segment associated with the green colour component because this is the most luminous colour of the three components. This reference time segment is generally situated at the centre of the video frame (middle of the video frame period). Thus in the general case the time segment G2 is defined as the reference time segment.

In accordance with the invention, the video image is displayed by giving priority to lighting the cells of the valve during the reference time segment and the time segments closest to the reference time segment. This amounts to the same thing as selecting a triplet of reference time segments, in the present instance R2, G2 and B2.

Figure 3:
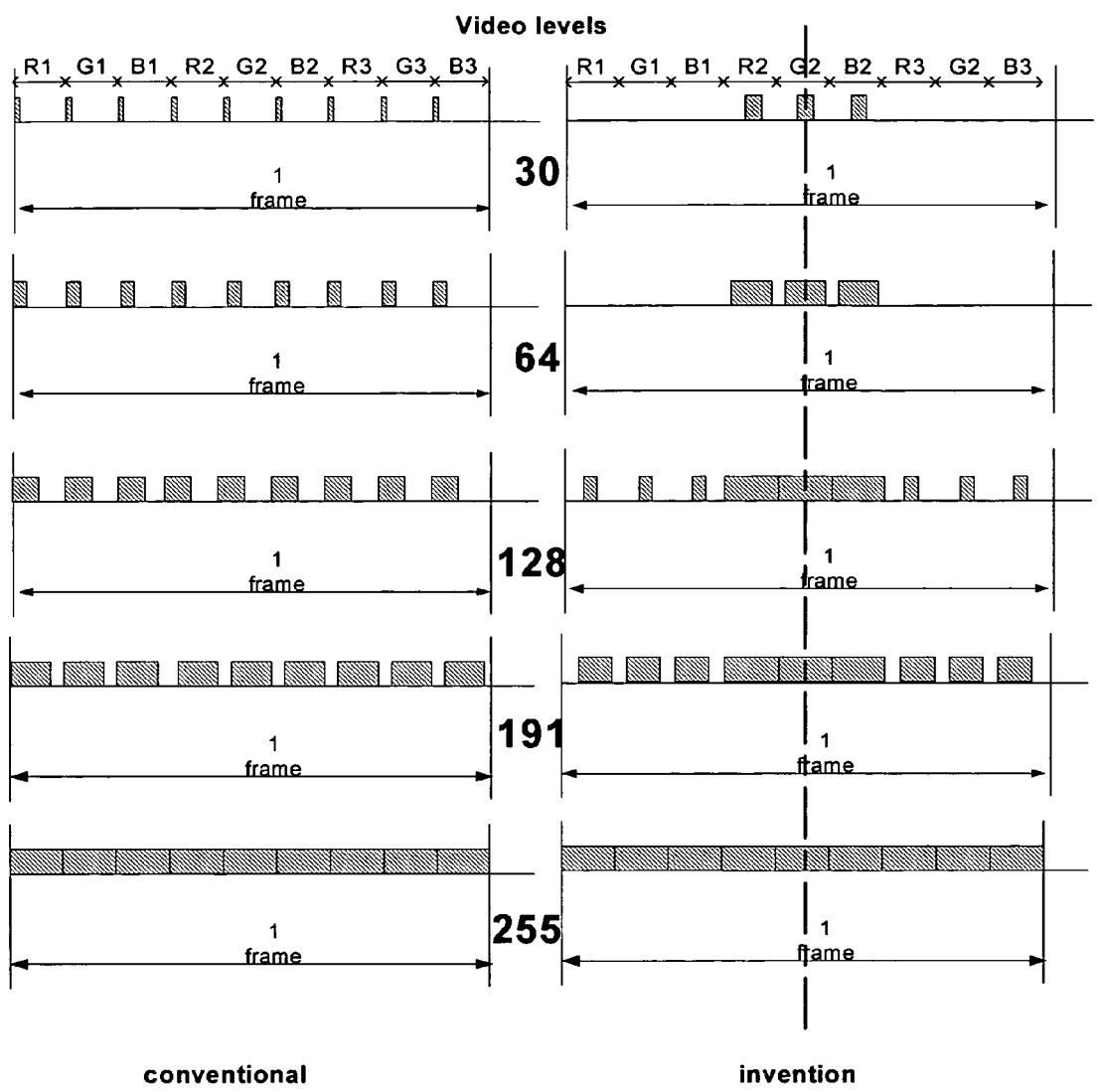
FIG. 3 shows a first embodiment of the method of the invention.

The right-hand portion of FIG. 3 illustrates how the method of the invention is applied to the display of five video levels (30, 64, 128, 191 and 255). The left-hand portion of the figure represents a conventional display.

As shown in this figure, whatever the video level to be displayed, priority is given to lighting the cells during the reference time segment and the time segments closest to it. For example, to display a grey level of 30 or 64, the cells are lit for a portion of the time of the segments R2, G2, B2 situated in the vicinity of the centre of the video frame. The cells are not lit during the other time segments.

To display grey levels of 128 and 191, the cells are lit throughout the central time segments R2, G2, B2 of the frame and during a portion of the time of the other segments. The same quantity of light is emitted on either side of an axis of symmetry situated at the centre of the reference segment and represented in chain-dotted line in the figure. In the present example, the segments R1 and R3 are considered equidistant from the centre of the reference time segment G2. The cells are therefore lit for the same duration during these two time segments.

Of course, lighting the third red time segment before the first red time segment could be envisaged, as it is closer in time to the reference time segment. Similarly, the first blue time segment could be lit before the third blue time segment.

Thus, according to the invention, a time segment is lit only if the time segments of the same colour closest to the reference time segment are already lit. The time segments closest to the reference time segment do not necessarily designate the time segments closest in time to the reference time segment. As mentioned above, two segments of the same colour belonging to triplets R, G, B adjacent the triplet comprising the reference time segment could equally be considered equidistant from that reference time segment and equally close to the reference time segment.

Finally, to display the level 255, the cells are lit throughout the time of all the time segments of the video frame as in a standard display.

Figure 4:
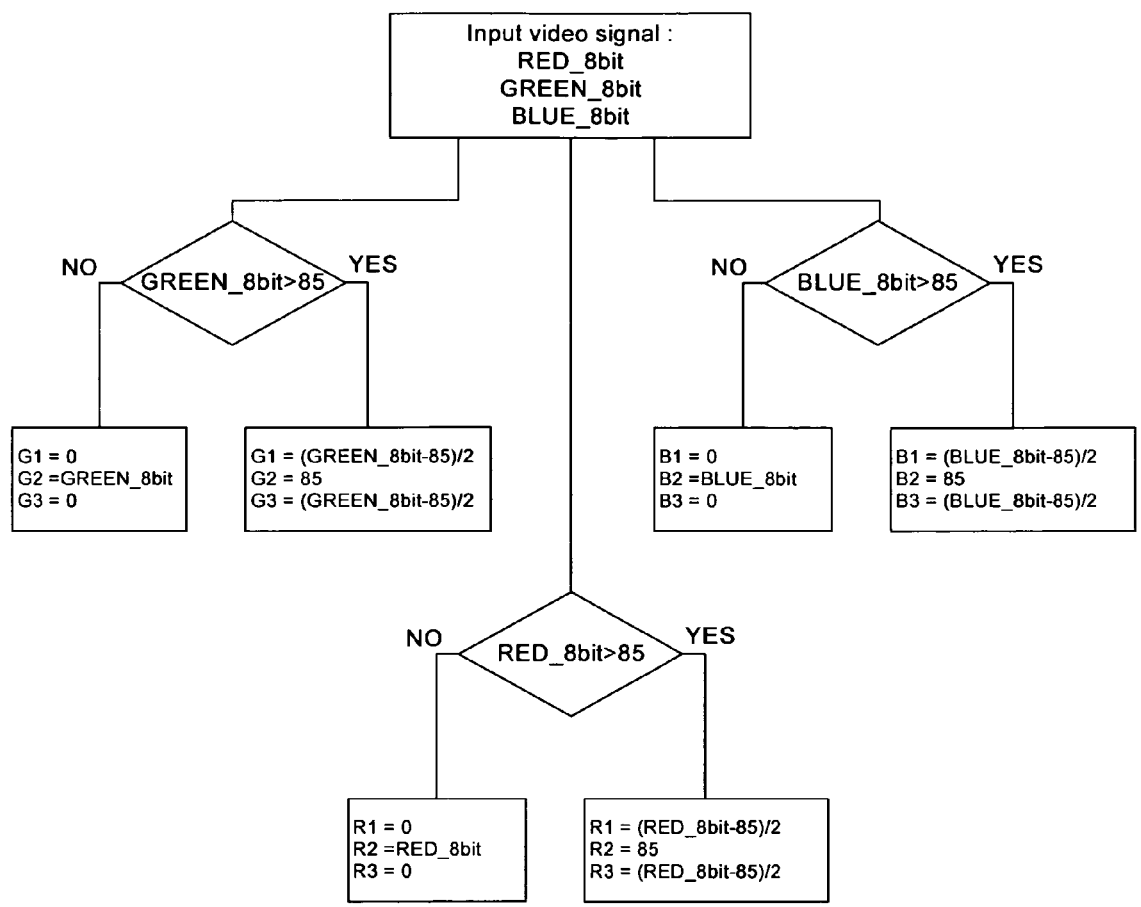
FIG. 4 is a flowchart showing how the video level values to be displayed during each of the time segments of the video frame are determined.

FIG. 4 is a diagram showing one example of determining video level values to be displayed during each of the time segments of the frame. An input video signal is considered having a video level value RED_8bit for the red component, a video level value GREEN_8bit for the green component, and a video level value BLUE_8bit for the blue component. If the GREEN_8bit value is less than or equal to 85 (=255/3), that value is displayed in its entirety during the segment G2. If it is greater than 85, the value 85 is displayed during the segment G2 and one half of the remainder is displayed during the segment G1 and the second half during the segment G3.

Similarly, if the value RED_8bit (respectively BLUE_8bit) is less than or equal to 85, that value is displayed in its entirety during the segment R2 (respectively B2). If it is greater than 85, the value 85 is displayed during the segment R2 (respectively B2) and a first half of the remainder is displayed during the segment R1 (respectively B1) and the second half during the segment R3 (respectively B3).

Figure 5:
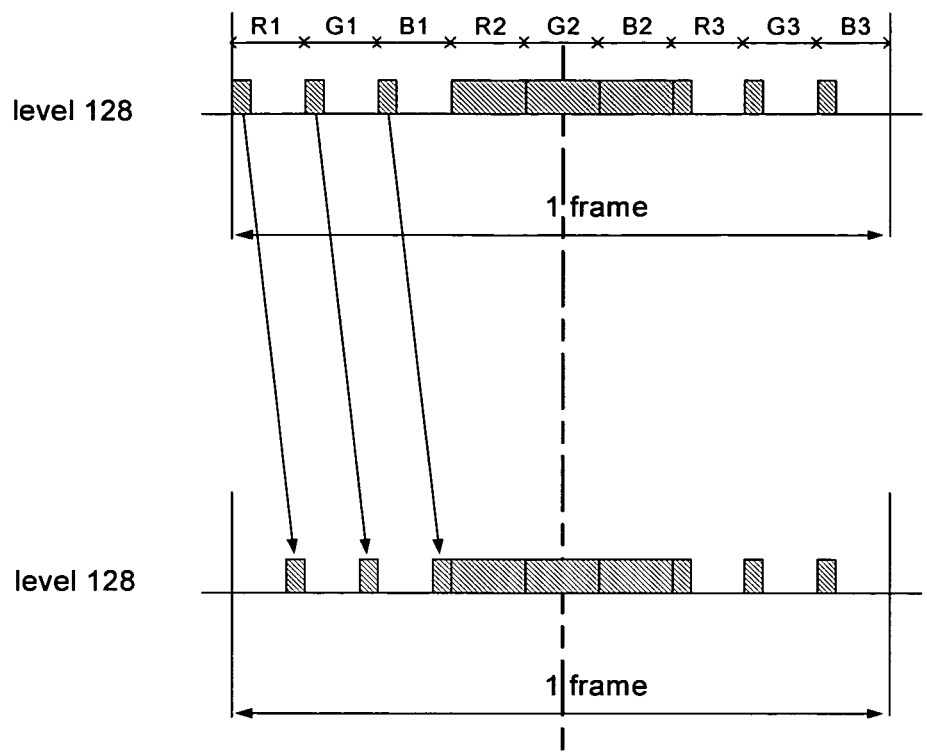
FIG. 5 shows an improvement to the method shown in FIG. 3.

In the embodiment shown in FIG. 3, if a cell is not lit throughout a time segment, the cell is lit at the beginning of the time segment. In an improved embodiment shown in FIG. 5, illumination during the time segments preceding in time the reference time segment, namely in the present situation the segments R1, G1, B1 and R2, is effected at the end of the time segment. This solution is easy to implement in an LCOS valve display device by comparing the control voltage applied to the cell of the valve and representing the video level to be displayed with a falling voltage ramp (negative ramp slope) for the time segments of the frame positioned before the reference segment and a rising voltage ramp (positive ramp slope) for the time segments of the frame positioned after the reference segment. In the case of the negative ramp, so long as the control voltage is below the voltage level of the voltage ramp, the cell blocks the passage of light through the valve; as soon as that control voltage rises above the ramp voltage, it allows light to pass. Light is therefore emitted at the end of the segment. In the case of the positive ramp, so long as the control voltage is greater than the voltage level of the voltage ramp, the cell allows light to pass through the valve; as soon as this control voltage falls below the ramp voltage, it blocks the passage of light. Light is therefore emitted at the beginning of the segment.

The effect of this is to concentrate further the emission of light in the vicinity of the reference time segment and thereby to reduce further the phenomenon of light break-up.

Figure 6:
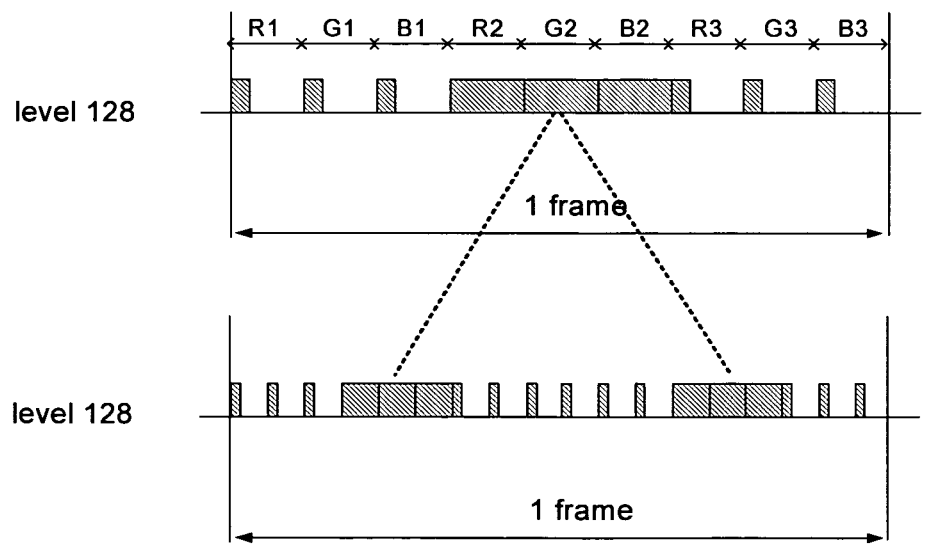
FIG. 6 shows a second embodiment of the method of the invention using two reference time segments.

Alternatively, it is equally possible to double the number of time segments by doubling the cell addressing frequency and dividing the video frame into two half-frames each having its reference time segment. The frame then includes two reference time segments. FIG. 6 shows this situation. The reference time segment of each half-frame is selected at the centre thereof, for example the centre of the green time segment. Display during each half-frame is then effected as described with reference to FIGS. 3 and 4. To reduce the blurring effect, the second portion of the video frame advantageously displays a movement-compensated image (interpolated from the first portion of the current frame and the first portion of the next frame).

The invention claimed is:

1. A method of displaying a video image in a sequential colour display panel including a plurality of display cells, wherein the video image to be displayed comprises a plurality of colour components and the image display period is divided into a plurality of consecutive time segments with at least three time segments assigned to each of the colour components, and wherein the video level of the pixels of the image is displayed by modulating the display time of the corresponding cells, the method comprising:

defining at least one reference time segment in said plurality of time segments, said at least one reference time segment being in the vicinity of the middle of the image display period, and displaying the image giving priority to lighting the cells during the at least one reference time segment and the time segments closest to the at least one reference time segment for each colour component of the plurality of colour components, the at least one reference time segment being assigned to one colour component and the time segments closest to the reference time segment being assigned to the other colour components of the plurality of colour components, a same quantity of light being emitted on either side of an axis of symmetry situated at the centre of said at least one reference time segment, wherein, if a cell is not lit throughout a time segment, the cell is lit during the portion of the time segment closest to the reference time segment.

2. The method according to claim 1, wherein the image signal comprises three colour components, namely a red component, a green component and a blue component, and the reference time segment is assigned to the green component.

3. The method according to claim 1, wherein the plurality of cells is a valve of liquid crystal on silicon cells.

4. The method according to claim 1, wherein the plurality of cells is a valve of micromirror cells.

5. The method according to claim 1, wherein the plurality of cells is a valve of organic light-emitting diode cells.

6. A sequential display panel for displaying a video image comprising:

a plurality of display cells, the video image to be displayed being supplied to the panel in the form of a signal comprising a plurality of colour components, wherein the image display period is divided into a plurality of consecutive time segments with at least three time segments assigned to each of the colour components and the video level of the pixels of the image is displayed by modulating the display time of the corresponding cells; and, a means for displaying the image by giving priority to lighting the cells during a reference time segment selected from said plurality of time segments and during the time segments closest to the reference time segment for each colour component of the plurality of colour components, said reference time segment being in the vicinity of the middle of the image display period, the at least one reference time segment being assigned to one colour component and the time segments closest to the reference time segment being assigned to the other colour components of the plurality of colour components, a same quantity of light being emitted on either side of an axis of symmetry situated at the centre of said at least one reference time segment, wherein, if a cell is not lit throughout a time segment, the cell is lit during the portion of the time segment closest to the reference time segment.

* * * * *